(12) United States Patent
Fox (10) Patent No.: US 11,554,311 B1
(45) Date of Patent: Jan. 17, 2023

(54) WAVEFORM REINFORCED SKATEBOARD DECK

(71) Applicant: Jeremy Fox, Huntington Beach, CA (US)

(72) Inventor: Jeremy Fox, Huntington Beach, CA (US)

(*) Notice: Subject to any disclaimer, the term of this patent is extended or adjusted under 35 U.S.C. 154(b) by 225 days.

(21) Appl. No.: 16/596,007

(22) Filed: Oct. 8, 2019

Related U.S. Application Data

(60) Provisional application No. 62/743,769, filed on Oct. 10, 2018.

(51) Int. Cl.
| | |
|---|---|
| A63C 17/01 | (2006.01) |
| B32B 21/13 | (2006.01) |
| B32B 38/06 | (2006.01) |
| B32B 37/02 | (2006.01) |

(52) U.S. Cl.
CPC ............ *A63C 17/01* (2013.01); *A63C 17/017* (2013.01); *B32B 21/13* (2013.01); *B32B 37/02* (2013.01); *B32B 38/06* (2013.01); *A63C 17/012* (2013.01); *B32B 2250/05* (2013.01); *B32B 2605/00* (2013.01)

(58) Field of Classification Search
CPC ..... B32B 21/13; B32B 2250/05; B32B 38/06; B32B 2605/00; A63C 17/017
See application file for complete search history.

(56) References Cited

U.S. PATENT DOCUMENTS

| | | | |
|---|---|---|---|
| 6,216,608 B1 * | 4/2001 | Woods | B65D 19/0012 108/56.1 |
| 6,460,868 B2 | 10/2002 | Madrid | |
| 6,782,929 B1 | 8/2004 | Madrid | |

* cited by examiner

*Primary Examiner* — George R Koch
*Assistant Examiner* — Christopher C Caillouet
(74) *Attorney, Agent, or Firm* — Advantage IP Law Firm (57) ABSTRACT

A waveform reinforced skateboard deck with an intermediate body extending between a nose end and an opposing tail end, the deck further including an outermost top rider bearing surface and an outermost bottom truck mounting surface with at least a portion of at least one of the surfaces having a plurality of spaced apart elongated waveforms defining peaks and troughs projecting along a substantially sinuous path between the nose and tail ends.

20 Claims, 10 Drawing Sheets

WAVEFORM REINFORCED SKATEBOARD DECK

CROSS-REFERENCE TO OTHER APPLICATIONS

This application claims the benefit of U.S. provisional application No. 62/743,769, filed on Oct. 10, 2018, entitled the same, and which is hereby incorporated by reference in its entirety.

BACKGROUND

1. Field of the Disclosure

The disclosure relates broadly to riding platform constructions, and more specifically, to improvements in skateboard deck construction.

2. Background

The variety of tricks and stunts that may be performed using a skateboard continues to evolve as more and more skateboarders continue to push the envelope. This push places additional demands on the skateboard deck to withstand the repeated punishment associated with such tricks and stunts. Speed, vibration, impact, bending, compression, tension, sliding, spinning, grating, grinding, and torsion related forces may all be encountered during a particular trick or set of tricks. As one example, riding rails, curb edges, or other similar structures places considerable stress on the deck. Riders continue demand more deck durability as they seek to expand the envelope of what may be done with a skateboard. While rigidity and durability remain significant concerns, cost and performance are paramount as well. Trading these features off against one another makes skateboard deck design a challenging effort.

A variety of deck designs to improve strength, durability, and performance have emerged over the years. A well-known conventional approach is to use a laminated deck with several layers of wood plies with bonding agent sandwiched between adjacent layers. Bonding agents with different strengths have also been employed. However, such approaches have been known to significantly increase the overall weight of the deck. The addition of such weight often detracts from the performance characteristics of the deck and other solutions have been sought.

Another approach may be found in U.S. Pat. No. 6,460,868 (expired) and its related continuation-in-part U.S. Pat. No. 6,782,929, both to Madrid. In these patents, layers of the deck are embossed with a set of corrugations running parallel to one another and parallel to the linear direction of the grain in an upper and lower ply of the assembled deck. While such construction purports to strengthen the deck in terms of rigidity and torsion, it is apparent that projecting the corrugations with pointed ridges running parallel to the linear grain may introduce additional stress or fracture lines in the same direction as the parallel grain. Such construction has been found to frequently split along the grain line as straight corrugations lack torsional rigidity.

Given the drawbacks of the prior approaches to increasing the deck strength of a skateboard without sacrificing performance, there exists a need for an improved skateboard deck construction better able to withstand the demands of today's skateboarders by increasing the torsional rigidity of the deck.

BRIEF SUMMARY

In accordance with at least one embodiment disclosed herein, a skateboard deck is provided with an intermediate body extending between a nose end and an opposing tail end with at least a portion of at least one of the outermost surfaces of the deck having a plurality of spaced apart elongated waveforms defining peaks and troughs projecting along a substantially sinuous path.

In another implementation, the deck is comprised of multiple layers with at least one layer having a uni-directional grain pattern and the waveforms of at least one layer snake back and forth across the uni-directional grain pattern.

In another implementation, the waveforms are defined by compound curves.

In yet another implementation, the waveforms include curved and straight line segments.

In another implementation, the peaks and trough of the waveforms of adjacent layers are aligned or substantially aligned.

In another implementation, the peaks and trough of the waveforms of adjacent layers are offset from one another.

In yet another implementation, the waveforms cross back and forth across both a longitudinal grain and a transverse grain.

A method of constructing a waveform reinforced skateboard deck is also disclosed herein.

BRIEF DESCRIPTION OF THE DRAWINGS

Features and advantages of the various exemplary embodiments disclosed herein will be better understood with respect to the following illustrative description and drawings, which are not intended to limit the scope of the disclosure, and in which like numbers refer to like parts throughout and reference numbers may be re-used to indicate correspondence between referenced elements, and in which.

DETAILED DESCRIPTION OF THE PREFERRED EMBODIMENTS

In general terms, a number of exemplary waveform reinforced skateboard decks and methods of reinforcing skateboard decks are disclosed herein. Such waveform reinforced skateboard decks and methods of constructing the same seek to overcome the drawbacks of imparting a set of corrugations running in the same direction as the grain in at least one ply of a skateboard deck. In at least one exemplary embodiment, the reinforced skateboard deck may incorporate elongated snaking waveforms that may be imparted into at least one of its plies or layers and generally extend between at least a portion of the first and second ends of the skateboard deck. The snaking waveforms made up of peaks and troughs generally cross back and forth across, through, over and/or under at least one uni-directional grain in the same or another layer to strengthen the deck. The elongated waveforms may be imparted into a ply during a pressure forming process in a method of reinforcing and strengthening the skateboard decks. Alternatively, a form or insert incorporating the waveforms may be inserted between adjacent layers. Descriptions of several exemplary embodiments follow.

Figure 5:
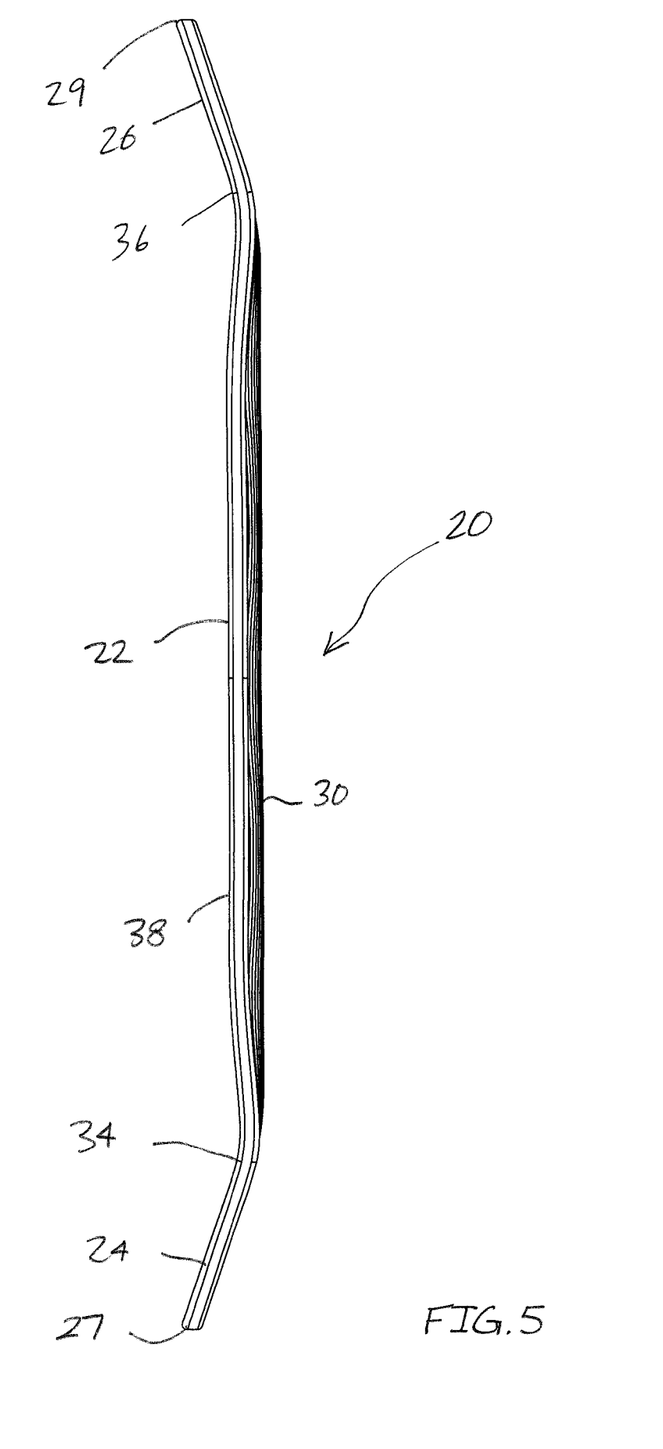
FIG. 5 is a right side view, in enlarged scale, of the skateboard deck of FIG. 1, the left side view being a mirror image thereof.
Figure 6:
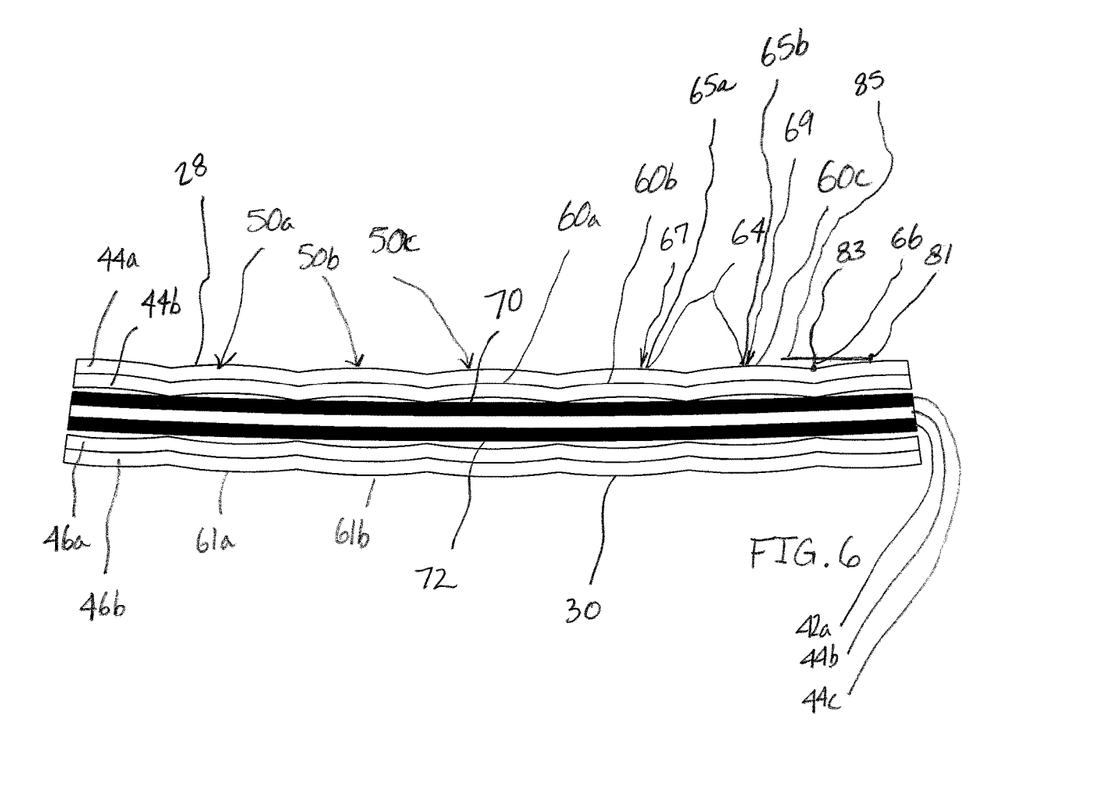
FIG. 6 is a schematic representation of a cross-sectional view taken through a transverse section of deck of FIG. 3 illustrating an exemplary set of various grain and waveform directions in the skateboard deck of FIG. 1.
Figure 7:
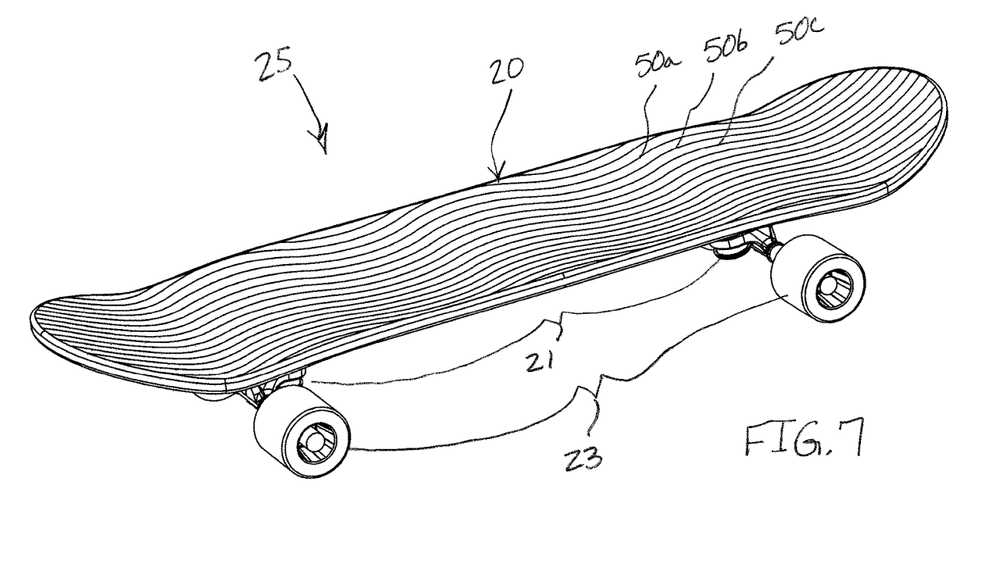
FIG. 7 illustrates an exemplary assembled skateboard with a set of trucks and wheels secured to a skateboard deck.

Referring now to FIGS. 1-7, a skateboard deck (or deck), generally designated 20, constructed to receive a set of front and rear trucks 21 with wheels 23 to form a complete skateboard assembly 25 as shown in FIG. 7, is illustrated. In this first exemplary embodiment, the deck 20 generally includes a main or intermediate body 22 interposed between a nose end 24 and a tail end 26. It will be appreciated that the terms nose and tail generally relate to the direction of travel with the nose end typically pointing in the direction of travel. However, as skateboards may be ridden in either direction, the terms nose and tail are generally interchangeable for purposes of this description and merely used as convenient terms to indicate a direction of travel.

With continued reference to FIGS. 1-7, the deck 20 further includes an upper foot bearing or riding surface 28 and an opposing underside or undersurface 30 providing a mounting region for a set of opposing front and rear trucks with each truck 21 (FIG. 7) bearing a set of wheels 23 (FIG. 7). Both surfaces have an exposed outermost deck surface but may be made of a single ply or contain multiple plies. In this description, it will be appreciated that one of ordinary skill in the skateboard construction and assembly arts would understand how to select and mount the trucks and wheels to the deck 20 described herein to assemble a complete skateboard 25 (FIG. 14) for riding.

As best shown in the right side view of FIG. 5, the profile of the foot bearing surface 28 is planar or substantially planar in the main body 22 (intermediate or middle region), although a slight central hump or rise may be present. The front end of the middle region then transitions in a gentle curve toward the lower surface 30 and then curves back upwardly away from the lower surface 30 and outwardly to the nose end 24. Such curvature generally defines the transition 34 between the main body 22 and the nose end 24 of the deck 20. The nose end 24 of the deck 20 terminates in a curved leading edge 27. Similarly, the rear end of the main body 22 transitions in a gentle curve toward the lower surface 30 and then curves back upwardly away from the lower surface 30 and outwardly to the tail end 26. This curvature generally defines the transition 36 between the main body 22 and the tail end 26 of the deck 20. The tail end of the deck terminates in a curved trailing edge 29. In this exemplary embodiment, when viewed from the side as in FIG. 5, the deck 20 somewhat resembles a recurve bow with a relatively flattened central section. However, in some decks, the intermediate, nose, and tail sections may all be substantially planar with no transition curvature between adjacent sections. It will be appreciated that the entire foot bearing surface 28 encompasses the upper surface of the main body 22, nose end 24, and tail end 26 as most riders will use the entire upper surface of the deck 20 when riding using a variety of foot positions.

As best shown in FIGS. 1-5, the deck 20 includes a left side 38 and an opposing right side 40, both of which are generally straight edges that transition into the curved regions 27, 29 forming the outer perimeter of the nose end 24 and the tail end 26, respectively. It will be appreciated that the sides of the deck may be bowed outwardly or inwardly or take other shapes other than a linear straight edge.

A particular length of the deck 20 is generally defined between longitudinally opposing points of the curved leading edge 27 and curved trailing edge 29 of the deck 20 with the maximum length along a longitudinal line projecting between the opposing outermost extensions of the nose end 24 and tail end 26. The length of the deck defines the reference for the longitudinal (or lengthwise) direction of the ply or layer grain. On the other hand, the deck width of the main body 22 is defined by the distance between the opposing straight edges 38, 40 of the left side and opposing right side and defines the reference for the cross (transverse) direction of the ply or layer grain as further explained below. Both the longitudinal and transverse grains are uni-directional along the length or width, respectively, of the deck.

With reference to FIGS. 1-6, it will be appreciated that the deck 20 is constructed of a number of wooden plies or layers as best shown in FIG. 6. In this exemplary embodiment, seven plies 42a-c, 44a-b, and 46a-b are used in constructing the deck 20. However, it will be appreciated that the number of plies is not meant to be limiting and either a single ply or multi-ply deck may be used. As shown in the cross-section view of FIG. 6, there are three center plies 42a-c wherein the centermost ply 42b is represented as being oriented with a lengthwise grain running generally in the direction of nose end 24 to tail end 26 of the deck 20 or short end to short end. The adjacent center plies 42a, 42c sandwich the centermost ply 42b and are represented as being oriented with a transverse or cross grain direction with the grain generally running from long side 38 to long side 40 of the deck 20. Each of the centermost plies 42a-c spans the entire width and length of the deck 20. The cross grain is generally parallel to one another and perpendicular to the length of the deck. Such combination of lengthwise and cross-wise grain between plies strengthens the skateboard deck by providing a variety of wood grains at right angles to one another. However, the sole use of plies with a uni-directional linear grain direction still introduces likely areas of weakness parallel to the grain direction or on or adjacent to a specific grain line as the deck 20 is bent, flexed, compressed, torqued, or otherwise contorted in use. Exemplary common stress points are directly on or adjacent the grain lines such as shown at 62a-f in FIG. 3 falling into either lengthwise grain lines 56 or cross-grain lines 58. Stress along these points often results in the fracturing, splitting or other failure of board integrity. The embodiments disclosed herein go at least one step further to further strengthen the deck 20 as will be discussed below.

Figure 1:
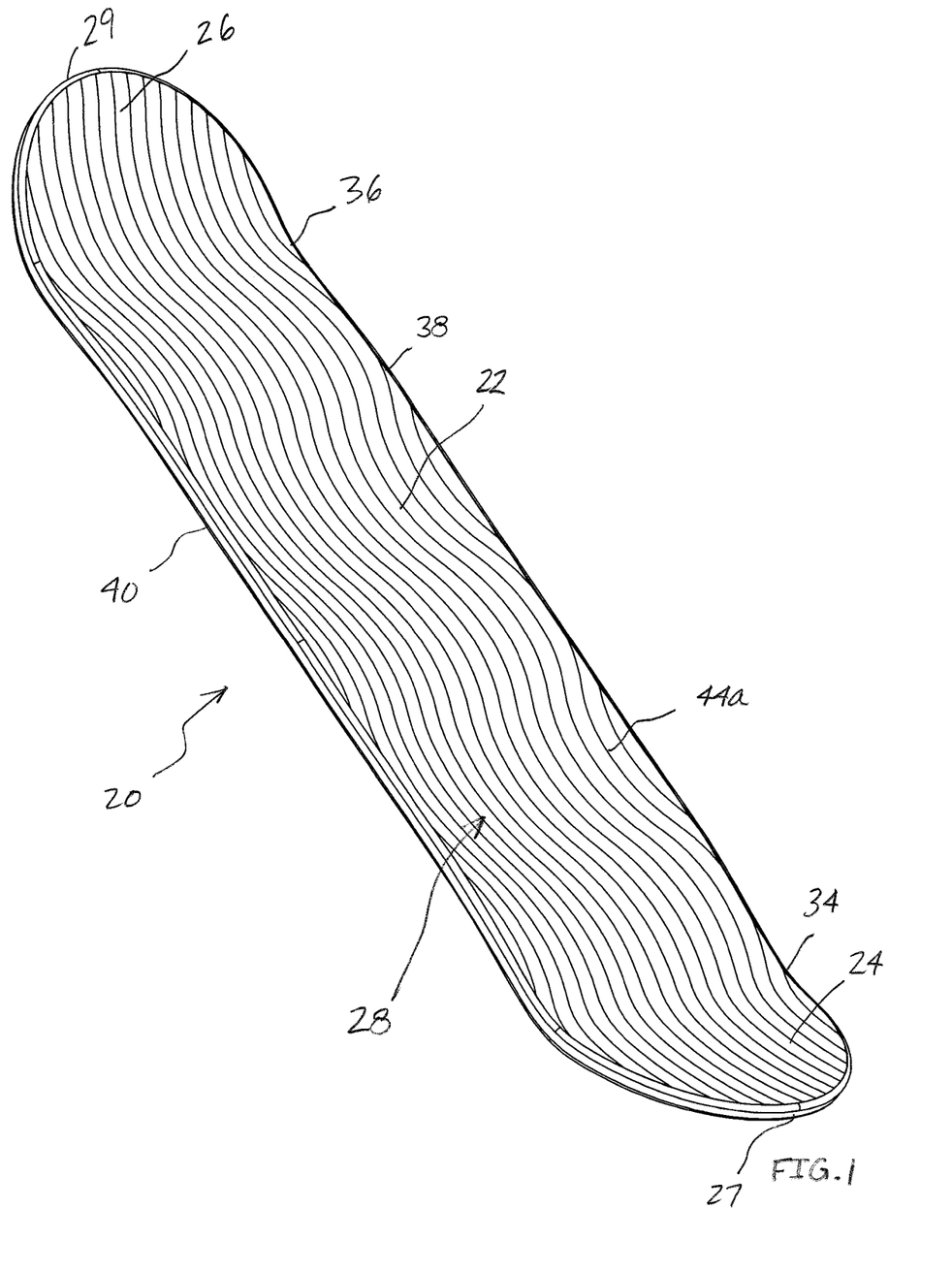
FIG. 1 is an upper isometric view of an exemplary reinforced skateboard deck in a nose down orientation.
Figure 2:
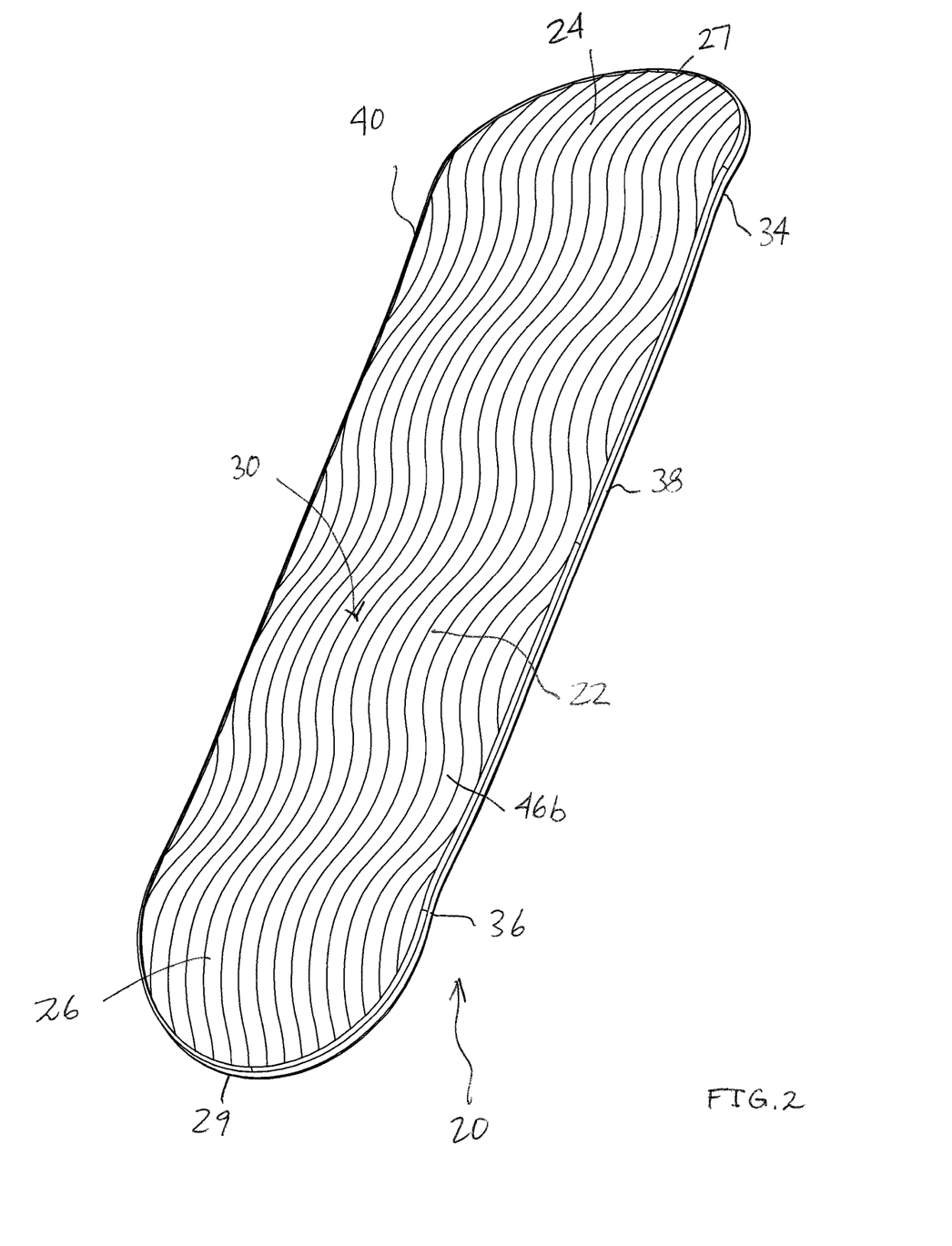
FIG. 2 is a bottom isometric view of the skateboard deck of FIG. 1 in a nose up orientation.
Figure 3:
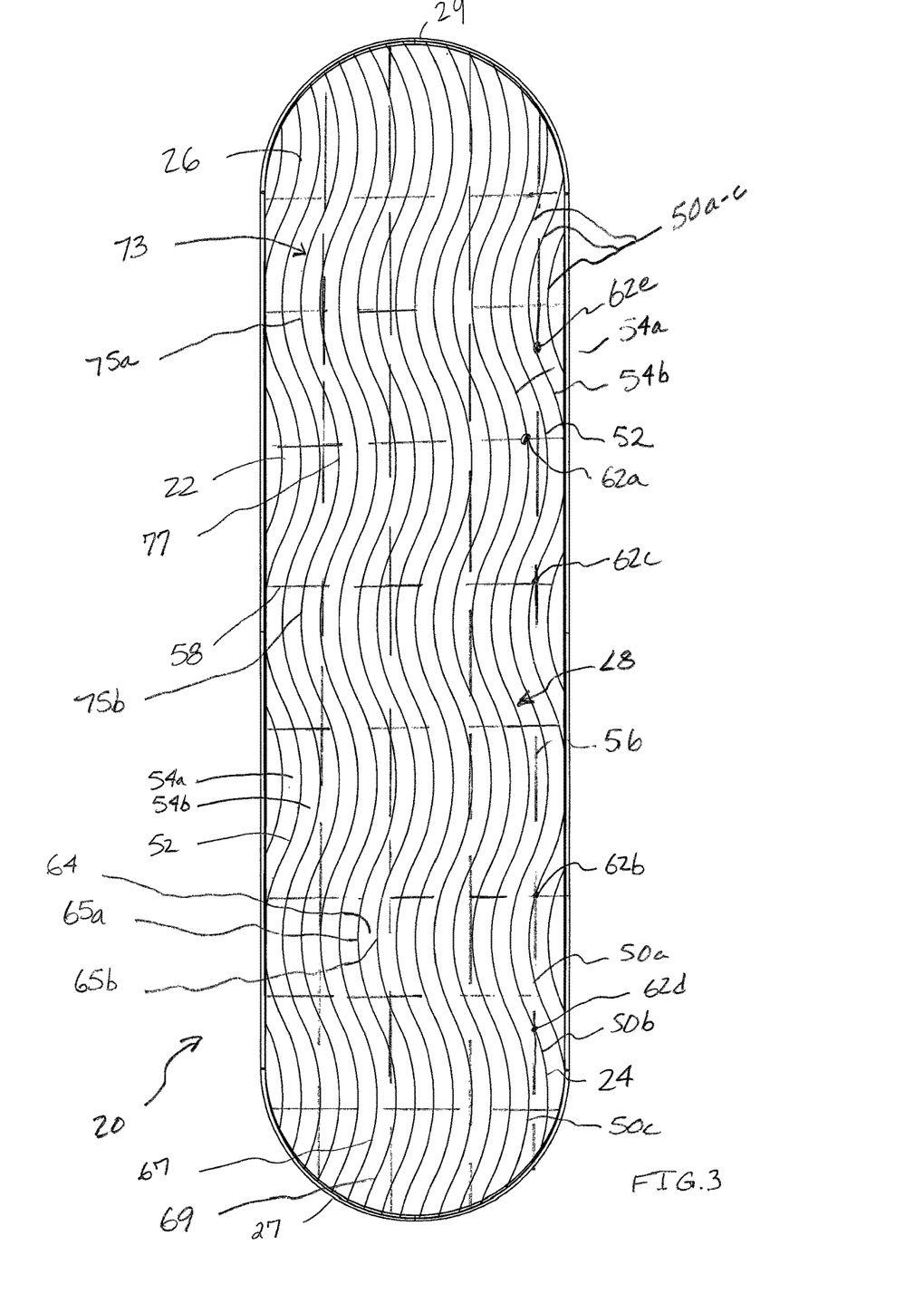
FIG. 3 is a top view of the skateboard deck of FIG. 1 in a nose up orientation.
Figure 4:
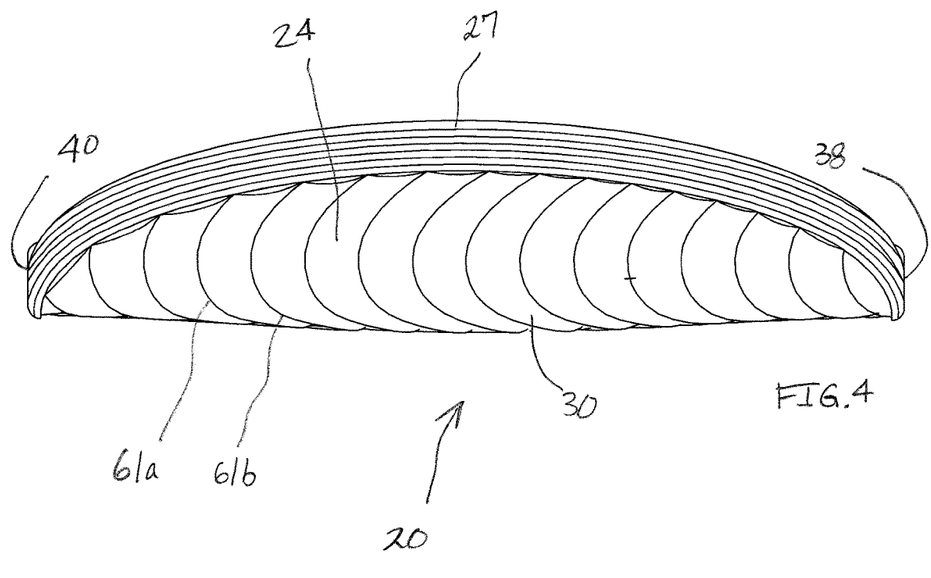
FIG. 4 is a front (nose) end view, in enlarged scale, of the skateboard deck of FIG. 1, the rear (tail) end view being identical except for an opposite waveform curvature.

With reference to FIGS. 3 and 6, the two upper plies 44a-b (FIG. 6) also span the width and length of the deck 20. However, at least a portion of both upper plies 44a-b includes a plurality of elongated waveforms, generally designated 50a-c (exemplary selections in FIG. 6 for ease of description). In this exemplary embodiment, each waveform includes a non-linear peak 52 and adjacent non-linear troughs 54a, 54b (example waveform with peak and adjacent troughs shown in FIG. 3) to either side unless too close to the edge of the deck to accommodate all three components of the waveform. The troughs are generally one-half the distance between adjacent peaks but this is not meant to be limiting. The peaks represent the outermost extent of the waveform while the bottom of each trough represents the innermost extent of each waveform. Together, the peaks and troughs follow the general meandering direction of the associated waveform 50a-c such that the peaks and troughs meander or snake back and forth across both at least uni-directional lengthwise grain 56 and/or uni-directional cross-grain 58 of the deck 20 when viewed from above (FIG. 3, for example). The lengthwise and cross-grain lines 56, 58 represent the grain direction in the corresponding center plies 50a-c or as may be found in the outer plies 44a-b or 46a-b as well. The intermediate upper waveform ply 44b includes similar waveforms, generally designated 60a-c in FIG. 6 with similar peaks and troughs. In this exemplary embodiment, the waveforms 50a-c of the uppermost ply 44a and the waveforms 60a-c of the upper intermediate ply 44b are substantially in vertical alignment with the adjacent peaks of adjacent plies being substantially vertically aligned and the adjacent troughs of adjacent plies also being substantially vertically aligned as shown in FIG. 6, although the waveforms may also be offset from one another from ply to ply.

More specifically, with continued reference to FIGS. 3 and 6, the waveform 50a-c in the exemplary uppermost ply 42a meander back and forth across both the lengthwise grain lines 56 and cross-grain lines 58 such that the waveforms 50a-c crosses the lengthwise grain or cross-grain at stress points 62a-f at other than parallel or right angles. Instead, the waveform crosses back and forth across the uni-directional lengthwise grain or cross-grain of at least one other ply in the deck 20 at an obtuse or acute angle relative to the lengthwise or cross-grain directions at a plurality of locations. For example, the peak of waveform 50a passes through stress points 62b, 62c, and 62e at obtuse or acute angles while peak 50b passes through stress point 62d and peak 50c passes through stress point 62a. Each waveform 50a-c includes at least one trough that also passes through the long grain 56 or cross grain 58 at various stress points at other than parallel or right angles. It will be appreciated that adjacent waveforms may share a common trough portion.

Referring to FIG. 6, the upper intermediate ply 44b includes similarly aligned waveforms 60a-c and is located adjacent the topmost center ply 42a. The introduction of waveforms 50a-c and 60a-c into the uppermost plies 44a-b, respectively, over the top surface 70 of the center ply stack 42a-c further reinforces the deck 20 at likely linear grain induced stress points (for example, at long grain or cross grain points 62a-f) where high concentrations of stress are most likely to result in deck fatigue and failure thus lowering the likelihood of a structural deck failure. Such meandering waveforms overcome the linear grain weak points and further supplement the incorporation of lengthwise grain and cross-grain orientations in different plies of the deck 20. In other words, the curving waveforms reduce the likelihood of the deck splitting along a linear grain orientation due to increasing the torsional rigidity of the deck 20 as such points of weakness and throughout the deck.

In a like manner, the lowermost plies 46a-b are constructed the same as the uppermost plies 44a-b but inverted relative to the uppermost plies 44a-b and applied together adjacent the bottom surface 72 (FIG. 6) of center ply stack 42a-c thereby further reinforcing the underside 30 of the deck 20. Lowermost plies 46a-b include peaks 61a, 61b, as for example in FIG. 4, and adjacent troughs similar to their upper ply counterparts in this exemplary embodiment. It will also be appreciated that the waveforms may appear in or be imparted into the same ply having a uni-directional grain, either longitudinal or cross-grain, or in adjacent ply. In addition, the waveform plies may be provided in the form of an insert between adjacent plies.

The advantages of the wave pattern (e.g. plurality of waveforms 50a-c, 60a-c) over a straight corrugation format as in earlier approaches is that the two outermost layers of skateboard deck plies, layers, or veneers typically have a longitudinal grain, and as such, are stressed by a similarly directional linear embossed corrugated pattern. The wave pattern of the embodiments disclosed herein serves to dissipate and disrupt potential stress cracks through not continuously following the outer layers of wood veneer grain direction. If a crack should appear, the wave pattern may also serve to reduce the crack from spreading further. The relative importance of snaking back and forth across longitudinal (single direction plywood grain) is to reduce longitudinal splitting parallel to the grain (mixture of with grain and cross-grain in same layer using a snaking reinforcement element). The same applies to snaking back and forth across cross-grain plies as well.

In this exemplary deck embodiment illustrated at FIGS. 1-7, the waveform pattern includes a set of individual waveforms that are generally in the form of a sine wave, parallel or substantially parallel to one another, and equidistantly spaced throughout the deck both longitudinally and transversely. As shown in FIG. 3, taking the waveform generally designated 73, as an exemplary representation of an individual waveform, each individual waveform has its own wavelength (lambda 1) such as defined by the gap or spacing between adjacent peaks (or crests) 75a, 75b on the same waveform 73. The amplitude for an individual waveform is defined as one-half the distance between a peak 75a for example and an adjacent trough 77 on the same waveform or one-half the wave-height (peak to trough). In this exemplary embodiment the wavelengths and amplitudes of each individual waveform are constant or substantially constant throughout the deck, although this is not meant to be limiting as explained for other embodiments below.

In addition, in this exemplary embodiment of the waveform reinforced skateboard deck 20, the waveforms have a constant or substantially constant wavelength (lambda 2) defined for example as the spacing 64 between adjacent peaks 65a, 65b of adjacent waveforms 67, 69 in FIGS. 3 and 6. The waveforms also have a second amplitude when viewed in cross-section as shown in FIG. 6. As shown in FIG. 6, the amplitude is one-half of a vertically aligned distance (also referred to as the wave height or depth) indicated as the short segment 66 between the horizontally projecting line 85 and the trough 83 adjacent to peak 81. This amplitude may be held constant or relatively constant throughout the deck. However, variations to waveform orientations, spacing, locations, continuity, and to wavelengths and amplitudes in either top, bottom, side, or cross-sectional viewpoints at different positions throughout the deck are also contemplated and fall within the scope of this disclosure with some non-limiting examples of such variations described below.

Figure 8:
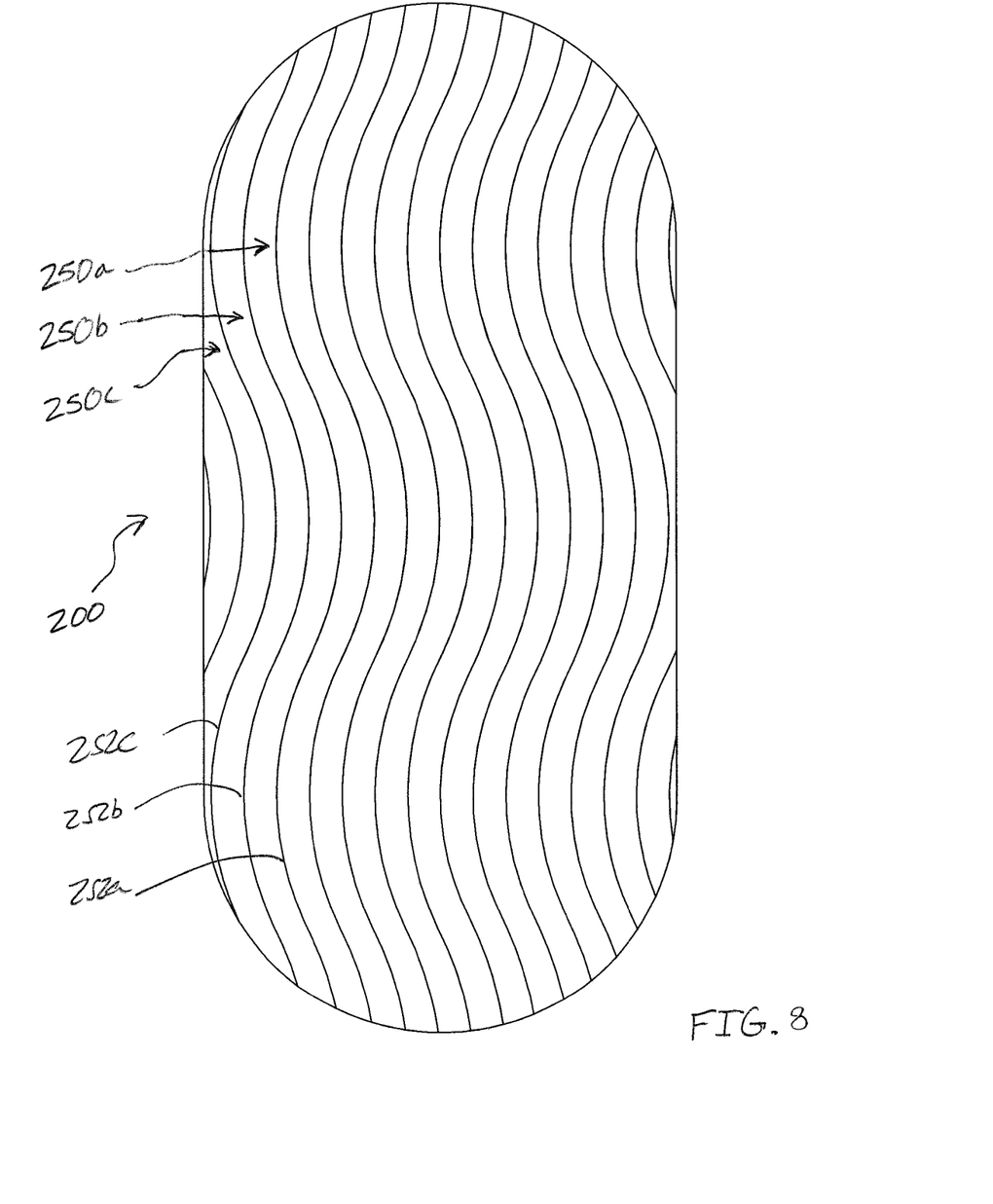
FIG. 8 is a top view of a skateboard deck with an alternative waveform pattern with wider spacing compared to FIG. 3.

The equidistantly spaced parallel waveform sinewave curvature described above is not meant to be limiting. One example of an alternative waveform pattern that may be incorporated into the deck 200 is shown in the top view of FIG. 8. In contrast to the embodiment described above for FIGS. 1-7, the deck 200 in FIG. 8 incorporates a set of waveforms 250*a-c* with peaks 252*a-c* spaced further apart than their counterparts in FIG. 3. In FIG. 8, the spacing between peaks on adjacent waveforms has been increased approximately 1.5-2.0 times the spacing of the spacing of the deck 20 in FIG. 3. The deck 200 is also shorter in length but wider in width to demonstrate the applicability of the waveforms to different sized decks. Thus, it will be appreciated that the wavelengths and spacing between adjacent peaks and troughs may be varied from deck to deck and also within the same deck as discussed below.

Figure 9:
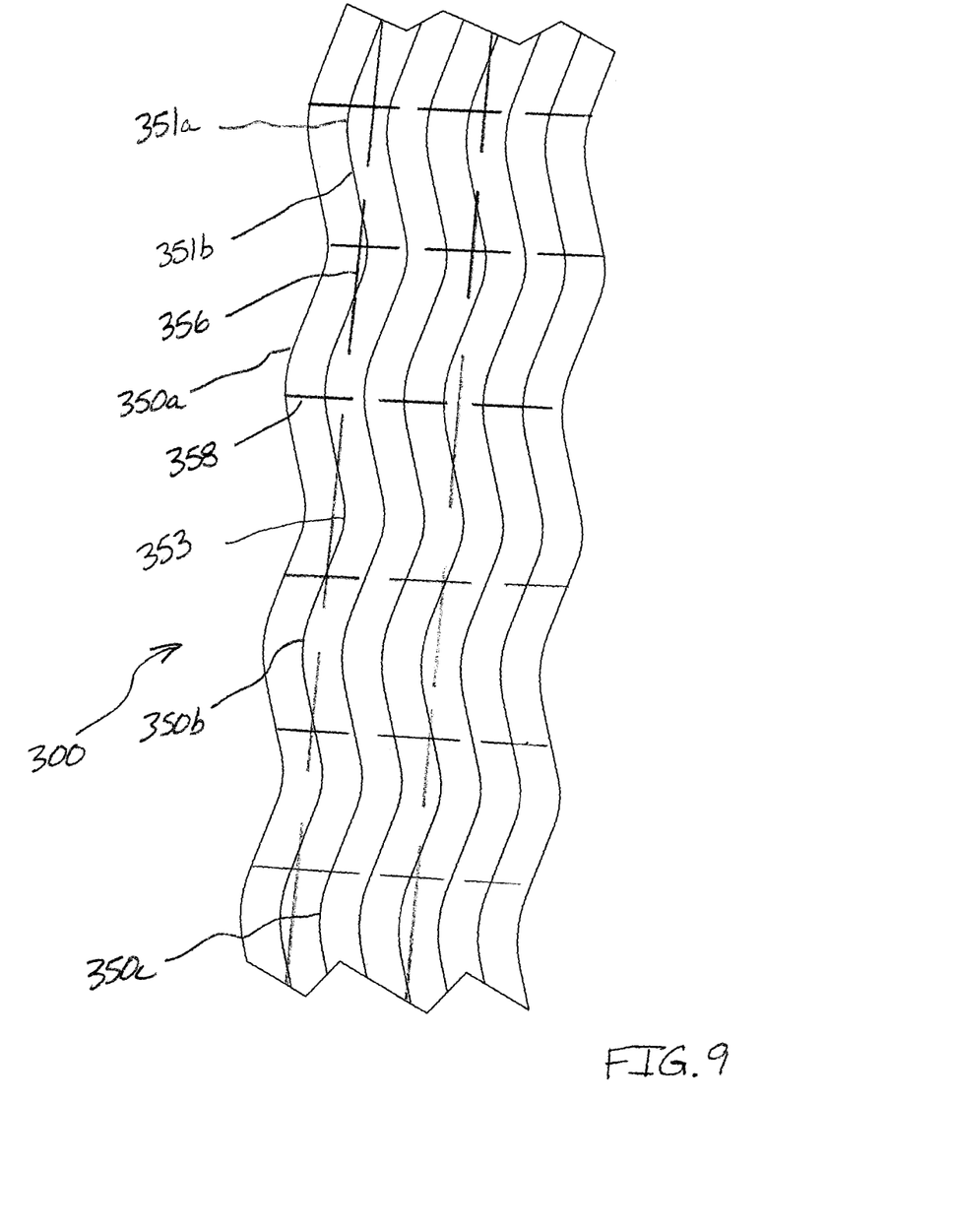
FIG. 9 is a partial cutaway view taken from a skateboard deck with an alternative waveform pattern with both curved and linear segments.

In another exemplary embodiment as illustrated in the cutaway view of FIG. 9, a portion of a deck 300 with an alternative waveform is shown. While a smooth, curving, continuous waveform is preferred, the exemplary waveforms 350*a-c* mix both curved segments 351*a* and linear segments 351*b* that are continuous throughout the waveform. In this exemplary embodiment, the peaks of each waveform have a gradual curved transition such as that exemplified by peak 353. Thus, while prior embodiments disclosed herein incorporate waveforms presenting a compound curve of continuously curving segments, other variations may incorporate linear segments or even pointed peak or troughs provided such segments cross the long grain 356 and cross grain 358 at acute or obtuse angles. In addition, it will be appreciated that the waveforms may be continuous throughout the deck or discontinuous. Discontinuous waveforms may be used on the lower surface 30 of the deck 20 creating a gap where the trucks 21 are mounted, on the upper or lower surface where a logo is imprinted, or where stress points are not found to be as critical for deck durability for example. In addition, waveforms with gaps may be used to allow for localizing stress reduction. It will further be appreciated that adjacent waveforms may have peaks and troughs that are offset from one another and/or inverted at different locations relative to the opposing segments of the adjacent waveform. Non-adjacent waveforms may have such construction as well. While a purely sawtooth waveform consisting of linear segments with sharp peaks and troughs is not preferred, embodiments constructed with such waveforms meandering back and forth across the long grain and cross grain orientations of the deck would fall within the scope of this disclosure.

Figure 10:
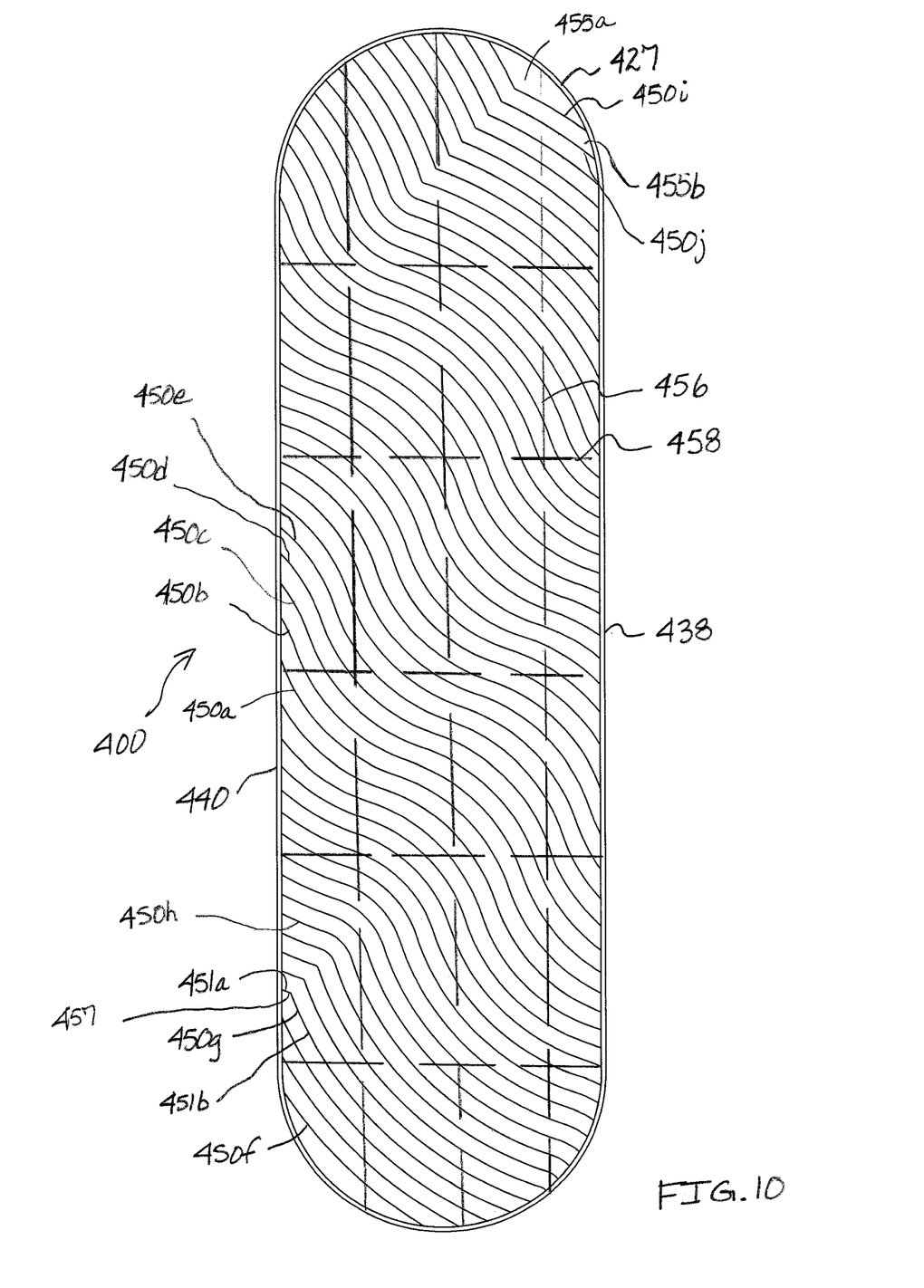
FIG. 10 is a top view of a skateboard deck with an alternative waveform pattern skewed in relation to the longitudinal grain of the deck.

In yet another embodiment of the skateboard deck, generally designated 400, the wave forms may be tilted or skewed relative to the longitudinal grain 456 and cross grain 458 directions as best shown in FIG. 10. Here, the five waveforms 450*a-e* illustrated are all skewed relative to the length of the deck 400 but still cross back and forth over the lengthwise grain 456 and cross-grain 458 of the same ply or at least one other ply. In FIG. 10, the skew angle is approximately 135 degrees measured from the left side edge 438. However, this skew angle is not meant to be limiting. Other waveform variations may be found in deck 400 as well. For example, waveform 450*f* is a single arc and not a compound curve. Waveform 450*g* includes a short straight segment 451*a* and a curved segment 451*b* with a sharp peak 457 at the transition. The waveforms between waveform 450*g* and 450*h* gradually lose their sharp peaks until becoming completely smooth in waveform 450*h*. The majority of the waveforms are constructed with compound curves as in waveform 450*h*. At the top end 427 of the deck 400, a dual linear segment (or with slight curvature) 450*i* creates a wider spacing 455*a* between the edge 427 of the deck 400 and the waveform 450*i* than the spacing 455*b* between waveform 450*i* and waveform 450*j*. Such variation of spacing is not limited to the edge of the deck 400 and may be incorporated at any point in deck 400 between waveforms and the waveforms of other decks 20, 200, 300 described herein as well.

Materials: Conventional wood plies may be used in constructing the skateboard deck with adhesive between layers. The waveforms may be imparted or embossed onto the plies during the manufacturing process or added as lightweight, durable inserts constructed of a suitable material. Trucks and wheels have a conventional construction.

Method of manufacturing: Conventional deck construction techniques may be used with some modifications. Prior to final lamination and shaping of the deck, one or more inserts bearing a selected waveform are introduced above and/or below selected layers, veneers, or plies of the deck. The plies are then compressed to impart or emboss the waveforms into the plies using conventional press techniques. The waveform plies are then added to the top and/or bottom of the center plies having the long grain and cross grain with adhesive between each adjacent layer. The entire deck is then pressed and shaped (bent) into the desired final shape. The deck is held in the preferred shape until the adhesive is cured to retain the deck in the desired shape generally resulting in an exemplary arrangement such as that shown in FIGS. 1-7.

In view of the foregoing, at least one object supported by one or more embodiments described herein is to introduce a waveform with peaks and troughs into one or more plies (or as inserts between plies) of a skateboard deck wherein the waveform crosses back and forth over, under, or through a uni-directional grain in the same or other ply to reinforce the deck. One exemplary skateboard deck may comprise a plurality of plies or layers with at least one layer including grain running in a substantially linear direction and at least one reinforcement layer including a meandering waveform with a combination of peaks and troughs that cross over or under the grain of the same or at least one layer instead of parallel to that grain.

At least one other layer projecting at substantially right angles to the grain of the at least one layer may be introduced wherein the meandering waveform crosses the grain of the at least one other layer as well. The waveform may take a variety of shaped including a sinewave, compound curved, sawtooth or combination thereof and may project across the entire deck or a portion thereof. In another embodiment, the waveform is continuous while in another the waveform may be discontinuous. One exemplary deck includes a set of seven plies with three central plies including a central long grain ply sandwiched by two cross grain plies, which in turn are covered by a set of two waveform plies may provide the construction of at least one deck embodiment.

It is also an object of at least one embodiment disclosed herein to improve prior strengthening process and skateboard deck constructions. By providing a plurality of waveforms in one or more deck layers that meander or snake back and forth a uni-directional grain in an adjacent layer, areas of stress concentration are better distributed about the deck thus increasing rigidity in more than one direction to enable improved performance of various skateboard techniques and maneuvers.

These and other objects may be satisfied by one or more embodiments disclosed herein, as well as many of the intended advantages thereof, will become more readily apparent when reference is made to the entire description taken in conjunction with the accompanying figures with the understanding that the embodiments described herein may satisfy one or more of the objectives.

It will be appreciated that the number, location, shape, spacing, continuity, wavelength, and amplitude of the waveforms may vary from the deck to deck as well as between plies or inserts or within the same ply or insert of a deck. Individuals waveform may also have such variations as well such as varying the shape, continuity, wavelength, or amplitudes along the length or width of the deck. It will be appreciated that a variety of waveforms may be incorporated into a skateboard deck constructed in accordance with this disclosure. Features and combination of features may be mixed as well. The variety may include waveforms spanning the length and width of the deck, even parallel spacing, offset waveforms, inverted waveforms, unevenly spaced waveforms, waveforms curved throughout, waveforms with linear segments crossing the longitudinal and cross grains, waveforms with discontinuous segments, waveforms spanning less than the length or width of the deck, and/or waveforms with a mixture of linear and curved segments.

In one exemplary implementation, an improved skateboard deck having a generally planar main body configuration extending into a nose end and an opposing tail end with a first elongated side edge and an opposing second elongated side edge between the nose and tail ends, a top rider bearing surface, and a bottom truck mounting surface. At least one of the top and bottom surfaces has a plurality of spaced apart elongated waveforms defining peaks and troughs projecting along a sinuous path between the nose and tail ends with the waveforms snaking back and forth across a uni-directional grain pattern of an adjacent deck layer.

It will be appreciated that the curved waveform corrugations (troughs and peaks) create strengthening not only in a lengthwise direction but also in a widthwise direction of the deck. The size of the radii of the waveforms may also be varied to allow tuning of the added strength bias (length vs. width) to be adjusted locally or throughout the deck where the waveforms are present.

It is also contemplated to incorporate an additional layer (plastic or otherwise) applied to the outer ply on the bottom side of the skateboard which will also become corrugated in the manufacturing process to serve as a low friction layer and with differing graphic decoration possibilities as compared to wood.

In addition, top layer and bottom layer veneers may be provided with the embossed or imprinted wave patterns and orientated in opposing directions to equalize stresses in the overall laminate and avoid warpage.

Certain objects and advantages of the invention are described herein. Of course, it is to be understood that not necessarily all such objects or advantages may be achieved in accordance with any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

While various embodiments have been described for purposes of this disclosure, such embodiments should not be deemed to limit the teaching of this disclosure to those embodiments. Various changes, additions, substitutions, and modifications may be made to the elements and operations described above to obtain a result that remains within the scope of the systems and processes described in this disclosure.

What is claimed is:

1. A waveform reinforced skateboard deck comprising:
a skateboard deck having a substantially planar intermediate body including a first elongated side edge and an opposing second elongated side edge extending between a nose end terminating in a leading edge and an opposing tail end terminating in a trailing edge, the deck further including an outermost top rider bearing surface and an outermost bottom truck mounting surface with at least a portion of both outermost surfaces having a plurality of elongated pressure imparted waveforms impressed therein with each waveform defining a plurality of peaks and troughs with the waveforms projecting along a path snaking back and forth laterally between the opposing side edges within the intermediate body and between the nose and tail ends with the plurality of peaks of each waveform facing toward the first elongated side edge and the plurality of troughs of each waveform facing toward the opposing second elongated side edge.

2. The deck of claim 1 wherein:
the deck is comprised of multiple layers with at least one layer having a uni-directional grain pattern consisting of a plurality of grain lines and the waveform of at least one outermost layer snakes back and forth across the plurality of grain lines of the uni-directional grain pattern at an obtuse or acute angle.

3. The deck of claim 2 wherein:
the outermost surfaces are adjacent to at least one uni-directional grain pattern layer.

4. The deck of claim 2 wherein:
the uni-directional grain pattern layer includes a longitudinal grain; and
the plurality of waveforms in each outermost surface snakes back and forth across the longitudinal grain.

5. The deck of claim 2 wherein:
the uni-directional grain pattern layer includes a transverse grain; and
the plurality of waveforms in each outermost surface snakes back and forth across the transverse grain.

6. The deck of claim 1 wherein:
the deck includes a plurality of internal plies including a first internal ply having a first uni-directional grain pattern and a second internal ply adjacent the first internal ply and having a second uni-directional grain pattern perpendicular to the first uni-directional grain pattern;
an uppermost ply providing an uppermost riding surface and overlying at least one internal ply and incorporating a first plurality of waveforms with a set of peaks and troughs;
a lowermost ply providing a truck mounting surface and underlying at least one internal ply and incorporating a second plurality of waveforms with a set of peaks and troughs; and
the first and second plurality of waveforms defining a snaking path that projects back and forth across the first and second uni-directional grain patterns.

7. The deck of claim 6 wherein:
at least some of the peaks and troughs of the respective first and second plurality of waveforms are substantially parallel to one another.

8. The deck of claim 6 wherein:
at least some of the peaks and troughs of the respective first and second plurality of waveforms are offset to one another.

9. The deck of claim 1 wherein:
at least some of the plurality of waveforms extend from an extreme nose end to an extreme tail end and from one side edge to the opposing side edge.

10. The deck of claim 1 wherein:
at least some of the waveforms are skewed at an acute or obtuse angle relative to the side edges of the deck.

11. The deck of claim 1 wherein:
the troughs of at least one waveform from the plurality of waveforms are half the distance between the corresponding peaks of two adjacent waveforms.

12. The deck of claim 1 wherein:
at least two of the waveforms are spaced equidistantly throughout at least a portion of the intermediate body.

13. The deck of claim 1 wherein:
at least one of the waveforms is defined by continuous compound curves.

14. The deck of claim 1 wherein:
at least one of the waveforms incorporates a linear section and a curved section.

15. The waveform reinforced skateboard deck as set forth in claim 1 wherein:
the nose end and the tail end curve upwardly and outwardly from the intermediate body when viewed from an upright side profile.

16. The waveform reinforced skateboard deck as set forth in claim 1 wherein:
the outermost bottom surface is curved with the opposing side edges elevated above a bottommost extent in the intermediate body.

17. The waveform reinforced skateboard deck as set forth in claim 1 wherein:
at least some of the plurality of waveforms in at least one of the outermost surfaces are of unequal length within the intermediate body.

18. The waveform reinforced skateboard deck as set forth in claim 1 wherein:
the waveforms of the outermost bottom surface are constructed to reduce the friction between the deck and an underlying surface when sliding thereon.

19. A waveform reinforced skateboard deck comprising:
a skateboard deck comprised of multiple plies with at least one ply having a uni-directional grain pattern consisting of a plurality of grain lines, the plies being secured together to define a substantially planar intermediate body extending between a nose end and an opposing tail end and having a first side edge and a second opposing side edge, the deck further including an outermost top rider bearing surface and an outermost bottom truck mounting surface with at least a portion of at least one of the plies having a plurality of elongated waveforms defining peaks and troughs projecting along a path between the nose and tail ends with the waveforms snaking back and forth laterally across the deck between the opposing side edges to cross over the grain lines of the uni-directional grain pattern at an obtuse or acute angle.

20. A waveform reinforced skateboard deck comprising:
a skateboard deck having an intermediate body including a first elongated lateral side edge and an opposing second elongated lateral side edge extending between a nose end terminating in a curved leading edge and an opposing tail end terminating in a curved trailing edge, the deck further being constructed of a plurality of plies including a top ply defining an uppermost rider bearing surface, a bottom ply defining a lowermost truck mounting surface, and at least one internal ply defining a first linear grain direction with both the uppermost and lowermost surfaces being impressed with a plurality of elongated compound curve waveforms spanning across the intermediate body between the lateral side edges, each waveform defining a set of alternating peaks and troughs projecting along a path snaking back and forth laterally between the opposing lateral side edges within the intermediate body and between the nose and tail ends with the peaks facing toward the first elongated lateral side edge and the troughs facing toward the opposing second elongated lateral side edge and across the linear grain direction defined by the at least one internal ply, the peaks and troughs being visible in both a top view of the deck and a bottom view of the deck as well as a cross-sectional view projecting from lateral edge to opposing lateral edge taken at a point along the intermediate body.

* * * * *